Aug. 8, 1961 R. E. PAGE 2,995,286

ELECTROSTATIC INCREMENTAL DRIVE UNIT

Filed Dec. 31, 1958 2 Sheets-Sheet 1

Aug. 8, 1961 R. E. PAGE 2,995,286

ELECTROSTATIC INCREMENTAL DRIVE UNIT

Filed Dec. 31, 1958 2 Sheets-Sheet 2

United States Patent Office 2,995,286
Patented Aug. 8, 1961

2,995,286
ELECTROSTATIC INCREMENTAL DRIVE UNIT

Ralph E. Page, Lagrangeville, N.Y., assignor to International Business Machines Corporation, New York, N.Y., a corporation of New York Filed Dec. 31, 1958, Ser. No. 784,299
14 Claims. (Cl. 226—156)

This invention relates to electrostatic incremental drive unit and has for an object the provision of an electrostatic incremental drive suited for magnetic tape.

The present invention is particularly applicable to incremental or low-speed compatible tape drives for recording binary bits of information at random time intervals. In applications of this type the magnetic tape frequently is required to be advanced in small increments of about .005 inch at rates up to 500 steps per second. While magnetic ratchets or escapements may perform this function, the extremely high frequency rate of operation required is not conducive to long life. The present unit does not have the above limitations and is an improvement on the plural ring species of the apparatus described and claimed in copending application Serial No. 784,279, filed December 31, 1958 by Clyde J. Fitch and assigned to the same assignee as the present application.

It is a further object of the invention to provide an electrostatic incremental drive unit suited for high frequency rate of operation and having a long life.

It is another object of the invention to provide an incremental drive for magnetic tape having two forward speeds and a reverse speed and using the electrostatic principle as a brake instead of as a driver. The additional forward speed provides for faster operation for the inter-record gap and the reverse drive permits the writing head to be placed over the tape capstan, thus eliminating the necessity of a drive unit on each side of the head.

It is a further object of the invention to provide a flanged capstan to guide the magnetic tape and minimize skew conditions.

It is a further object of the invention to provide a slow continuous speed reader.

In accordance with the present invention, there is provided an electrostatic incremental drive suited for magnetic tape including a rotor adapted for continuous rotation and having ring means thereon. Friction drive means is disposed between the rotor and the ring means normally to drive the ring means with the rotor The ring means includes a drive member for engaging the magnetic tape and a pair of separate rings, one disposed on either side of the drive member. Electrostatic resistance material is carried by and encircles each of the rings. Individual brake bands extend around and engage the electrostatic resistance material on each of the rings. The individual brake bands are adapted to be selectively energized to lock one of the bands to its respective ring and mechanical stop means is provided on each ring selectively effective on the drive member in timed relation with the selective energization of the brake bands to permit predetermined limited rotation of the drive member.

More specifically, and in accordance with the present invention, three rings are mounted on a continuously driven shaft and are normally driven from the shaft by a friction drive between the rings and a rotor carried by the shaft. Between one pair of rings there is disposed a tape capstan which is also in the form of a cylinder. Each of the rings has bonded to its outer surface a rim or face of the electrostatic resistance material. Each of the faces is adapted to be respectively engaged by a brake band and the rings are held stationary against the friction drive when a voltage is applied to the brake bands. The rings and the capstan are provided with overlapping projections and recesses whereby a voltage applied to one of the brake bands will be effective to limit the rotation of the other rings and the tape capstan by reason of the overlapping relationship between the projections and recesses.

Further in accordance with the invention the rotor is adapted for reverse rotation and provision is made for anchoring either end of the brake bands depending upon the direction of rotation of the rotor.

For further objects and advantages thereof and for a more detailed description of the invention, reference may be had to the following description taken in conjunction with the accompanying drawings in which.

Figure 1:
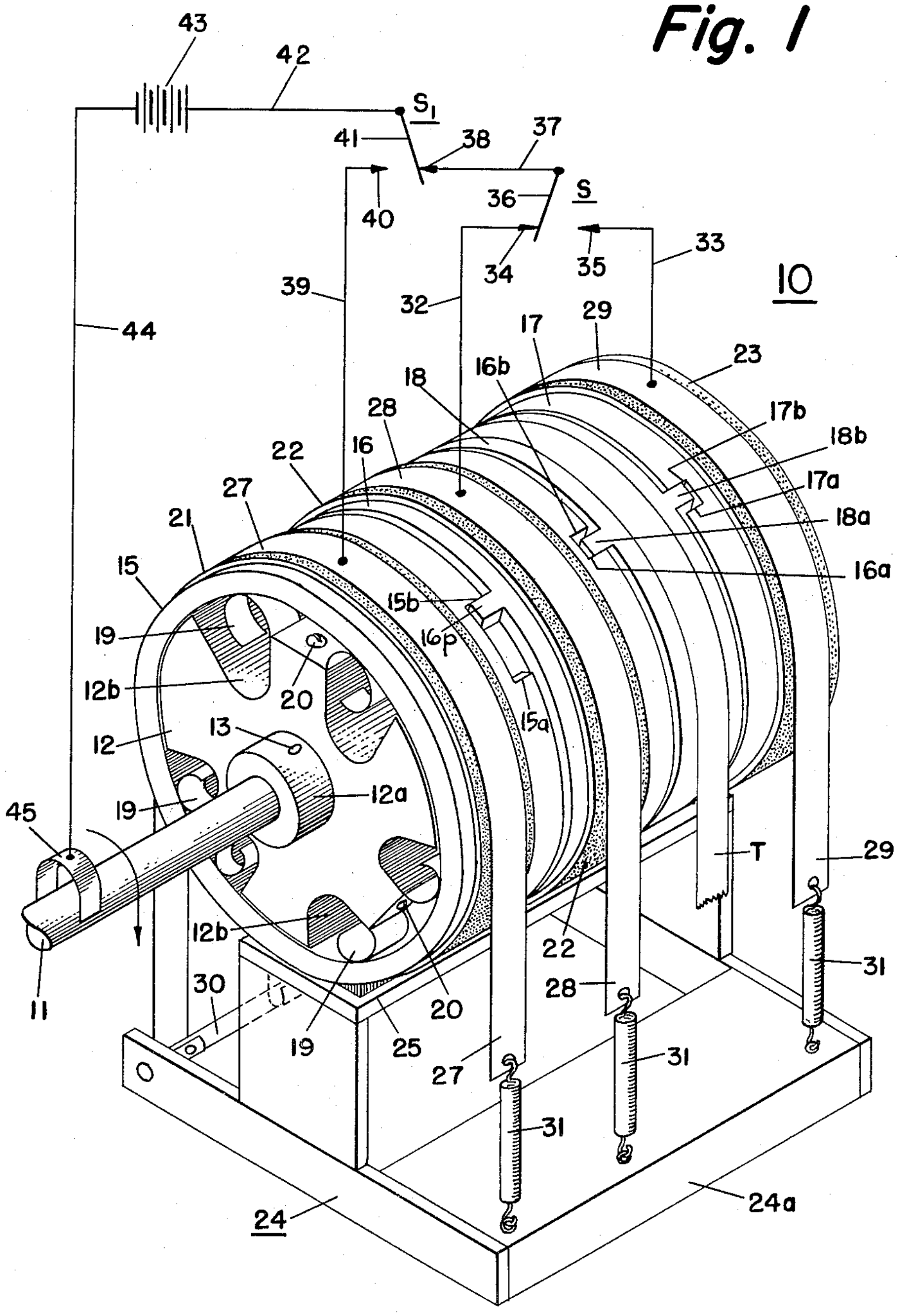
FIG. 1 is a schematic diagram of one form of the invention showing parts thereof in perspective.

Referring to FIG. 1, there is shown an electrostatic incremental drive unit 10 having a drive shaft 11 which is adapted for continuous rotation, as by a suitable motor and gear arrangement, not shown. The shaft 11 is adapted to rotate at a relatively slow speed, for example in the order of 60 r.p.m. A rotor 12 is mounted on the drive shaft 11 and has integral therewith a hub **12*a* through which extends a locking pin 13 for securing the rotor 12 to the drive shaft 11. The rotor 12 is made from electrically-conducting material, such for example as brass or an oilless bronze. Mounted on the outer surface of the rotor 12 are a plurality of rings 15–17 and a drive member 18 for the tape T. It will be noted that the drive member 18 is located between a pair of rings 16 and 17. The rings 15–17 and the drive member or tape capstan 18 are made from a suitable metal, such for example as steel. The rotor 12 is in the form of a drum and is provided with a plurality of recesses 12*b* which extend axially about the rotor 12 at spaced locations. Each of the recesses 12*b* is adapted to receive suitable friction drive shoes which have been illustrated as spring members 19 which are adapted to be secured to the rotor 12 as by screws 20. The springs 19 are electrically-conducting and also form a friction drive with the inner surfaces of each of rings 15–17 and the capstan 18. Thus the rings 15–17 and the tape capstan 18 are adapted normally to rotate with the rotor 12 and its drive shaft 11**.

Each of the rings 15–17 has bonded to its outer surface in an encircling relation faces or rims 21–23 respectively of a suitable electrostatic resistance material. The electrostatic resistance material is semi-conductive, i.e. having a resistivity within the general range of $10^6$ to $10^7$ ohms per cubic centimeter and may be composed of a mixture of natural or synthetic rubber, an inert filler such as asbestos, conductive particles such as carbon black and a phenolic resin.

Disposed beneath the rotor 12 on a support 24 is a brush 25 which is adapted to engage the surfaces of the electrostatic faces 21–23 and keep them clean. The brush or wiper 25 may be made of any suitable material, such for example as mohair which, by its own resilience, wipes the surface of the faces as they rotate and removes therefrom any foreign particles. Each of the rims or faces 21–23 of electrostatic resistance material is adapted to be engaged by brake bands illustrated as bands 27–29 respectively. The brake bands 27–29 are electrically-conductive and preferably are made from a flexible material such as thin strips of spring steel. The brake bands 27–29 are adapted to be in engagement with the respective faces 21–23 through an angle of approximately 180°. One end of each of the bands 27–29 is adapted to be secured to an insulator rod 30 carried by the support 24. The opposite ends of the brake bands 27–29 are adapted to be connected to coil springs 31 which are connected at their opposite ends to the support 24. It will be noted that the direction of rotation of the shaft 11 is such that the brake bands 27–29 will tend to pull against their ends which are anchored to insulator rod 30, which in turn is fixed to the support 24*a*. The springs 31 are adapted to control the friction between the faces 21–23 and the respective bands 27–29 when the rings 15–17 are normally rotating with the rotor 12 and no voltage has been applied to any of the brake bands 27–29.

As mentioned above, the tape capstan 18 is disposed between the pair of rings 16 and 17 and each of these ring members is provided with structure respectively cooperating in overlapping or interlocking relation with structure on the capstan for controlling the relative movements. As shown in FIG. 1, the tape capstan 18 is provided with a pair of projections or lugs 18*a* and 18*b* which are of the same size and extend from opposite sides of the capstan 18. The projection 18*a* is adapted to extend into and cooperate with a recess or slot formed by spaced shoulders 16*a* and 16*b* on the adjacent ring 16. Projection 18*b* is adapted to extend into and cooperate with a similar recess or a slot formed by the spaced shoulders 17*a* and 17*b* on ring 17. The width of the slots along the periphery of the respective rings 16 and 17, as determined by the spacing between the respective shoulders 16*a*—16*b* and 17*a*—17*b* are equal and it will be noted that such width is greater than the width of the cooperating projections 18*a* and 18*b* along the periphery of ring 18. The ring 16 is also provided with a projection 16*p* which is adapted to be received in a recess or a slot formed by the spaced shoulders 15*a* and 15*b* on ring 15. It will be noted that the width of the slot along the periphery of ring 15, as determined by the spacing between the shoulders 15*a* and 15*b*, is substantially greater than the width of the cooperating projection 16*p* along the periphery of ring 16 and also is substantially greater than the width of the respective slots in rings 16 and 17. The purpose of this will be hereinafter explained.

The brake bands 28 and 29 are each electrically connected by way of conductors 32 and 33 respectively to the respective stationary contacts 34 and 35 of a switch S. The movable contact 36 of switch S is connected by way of a conductor 37 to a stationary contact 38 of a switch S1. The brake band 27 is connected by way of a conductor 39 to the other stationary contact 40 of switch S1. The movable contact 41 of switch S1 is connected by way of conductor 42 to one side of a suitable direct current source illustrated as a battery 43. The other side of the battery 43 is connected by way of a conductor 44 to a brush or contact 45 which engages the drive shaft 11.

With the switches S and S1 in the position shown in FIG. 1, the brake band 28 is energized from battery 43 by way of a conductor 42, contacts 41 and 38, conductor 37, contacts 36 and 34 and conductor 32 thereby establishing a potential difference between the electrostatic resistance material or face 22 and the brake band 28. This locks the ring 16 against rotation and creates slippage between the friction drive members 19 and the inner surface of the ring 16. The tape capstan 18 is free to rotate with the rotor 12 until the projection 18*a* engages the shoulder 16*a* on the locked ring 16. When this occurs, the tape capstan 18 is locked against the rotation and the advancement of the tape T is temporarily stopped. The rotation of ring 17 likewise is stopped by engagement of shoulder 17*b* on ring 17 with projection 18*b* on capstan 18 and the rotation of ring 15 is stopped by engagement of shoulder 15*b* with the projection 16*p* on ring 16. Thus all of the rings 15–17 and the tape capstan 18 are prevented from turning with the rotor 12.

By transferring the movable contact 36 of switch S from engagement with contact 34 to engagement with contact 35, the brake band 28 will become deenergized and the brake band 29 will become energized by the voltage applied thereto from the battery 43. This establishes a potential difference between the face 23 and the brake band 29 locking the ring 17 against rotation with the rotor 12. The rings 15 and 16 continue to rotate with the rotor 12, closing the gap between projection 18*a* and shoulder 16*b* and advancing the capstan 18 until the projection 18*b* engages shoulder 17*a* on ring 17. At this time the magnetic tape T will have been advanced a predetermined distance which, as mentioned above, is in the order of .005 inch along the periphery of the tape capstan 18. The ring 16 will be prevented from turning further due to engagement of shoulder 16*b* with projection 18*a* on the then-locked capstan 18, and ring 15 will be prevented from turning due to engagement of shoulder 15*b* with projection 16*p* on ring 16. At this stage of the operation the gap will be between projection 18*a* and shoulder 16*a*. Thus, when the switch S is returned to its original position, a succeeding cycle will be initiated, locking ring 16 against rotation and freeing ring 17 to permit ring 17 and capstan 18 to be moved again to the position shown in FIG. 1. This moves the magnetic tape T another .005 inch increment. By transferring the movable contact 36 of switch S back and forth between the stationary contacts 34 and 35 in the above manner, the tape capstan 18 is stepped along in equal increments, providing the drive for the magnetic tape T.

After a block of information has been recorded on the tape T, it is desirable to separate this block from a succeeding block of information. This is accomplished by advancing the tape T a greater distance than the equal increments of information in each block. For example, the tape T may be advanced in the order of ¾ inch before recording the next block of information. To provide the separation distance or inter-record gap between the blocks of recorded information, the switch S1 is operated by moving the movable contact 41 out of engagement with stationary contact 38 and into engagement with contact 40. This applies a voltage to brake band 27 by way of the circuit extending from one side of battery 43 through conductor 42, contacts 41 and 40 and conductor 39 to brake band 27 thereby establishing a potential difference between the face 21 and brake band 21. This locks the ring 15 against rotation with the rotor 12 but permits rings 16 and 17 and the capstan 18 to continue to turn with the rotor 12 until projection 16*p* on ring 16 engages shoulder 15*a* on ring 15. After this operation has been completed, the movable contact 41 of switch S1 is transferred back into engagement with contact 38 and the normal stepping actions of rings 16 and 17 and tape capstan 18 are continued as described above.

In order to decrease the time required for producing the inter-record gap on the tape, the drive for the shaft 11 includes a second forward speed, such second speed being faster than the normal drive for recording the binary bits of information which make up each information block. This feature will be further described in connection with FIG. 2.

Figures 2, 3:
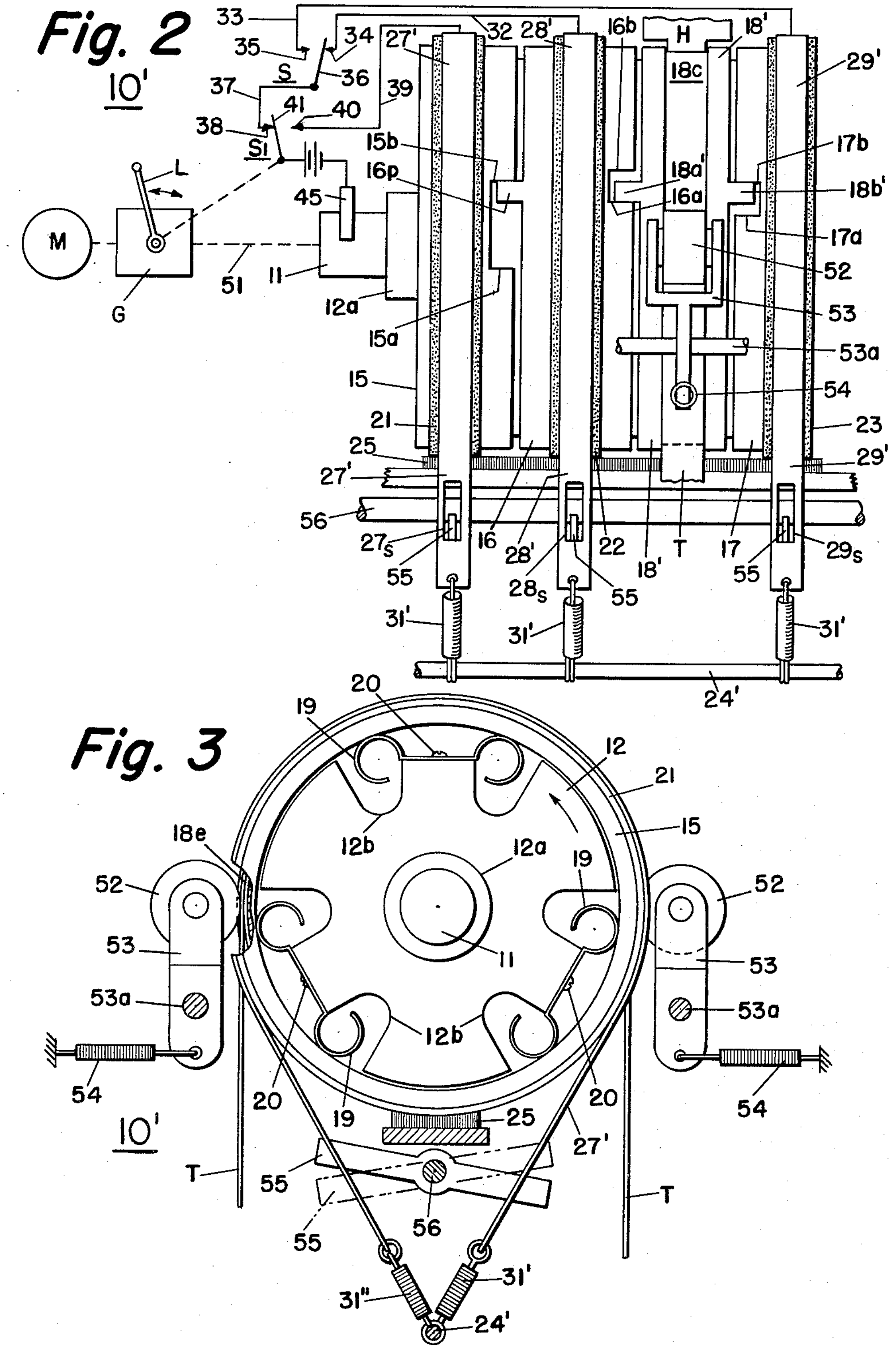
FIG. 2 is a schematic diagram of a modification of the invention showing parts thereof in elevation.
FIG. 3 is a view taken from the left-hand end of FIG. 2.

Referring to FIGS. 2 and 3, the invention has been illustrated in a form which includes not only two forward speeds, but also a provision for reverse rotation. This arrangement for a reverse drive permits the magnetic head to be placed directly over the tape capstan and eliminates the necessity of having a drive unit on each side of the head. In FIG. 2, the electrostatic drive unit 10′ is provided with a motor M of the reversible type and a two-speed gear train schematically illustrated by block G and mechanically connected, as indicated by broken line 51, to the drive shaft 11. For purposes of clarity of description, the parts in the modification shown in FIGS 2 and 3 which correspond to parts shown in FIG. 1 are identified by corresponding reference characters. It is to be understood that the sequence of operation of switches S and S1 is also the same in the modification shown in FIGS. 2 and 3, as described in detail above in connection with FIG. 1. The gear shift lever L is connected with the movable contact 41 of switch S1 for concurrent operation. Thus when lever L is moved to its high-speed position, contacts 40 and 41 will be closed and the circuit through contact 38 will be opened to provide the inter-record gap.

The tape capstan 18′ includes projections **18*a′* and 18*b′* which function in the same manner as previously described in connection with capstan 18 in FIG. 1. The capstan 18′ is provided with a central groove or channel 18*c* which is adapted to receive the magnetic tape T and prevents skew conditions of the tape. The groove 18*c* is surfaced with a resilient material 18*e*, FIG. 3, such for example as a cork-rubber composition to insure good contact of the tape T with the magnetic head H, FIG. 2. It is to be understood that the channel 18*c* may be formed by cutting a groove in capstan 18′ or by placing a pair of spaced flanges on a flat capstan, such as capstan 18**, shown in FIG. 1.

The tape T is adapted to be maintained in the channel **18*c* of tape capstan 18′ by means of guide rollers 52 which engage the tape at opposite sides of the capstan 18′ and extend into the channel 18*c*. The guide rollers 52 are journalled for rotation in lever arms 53 which are pivotally carried by pivots 53*a* and have their lower ends connected to springs 54 for biasing the guide rollers 52** against the tape T.

The brake bands 27′, 28′ and 29′ in FIG. 2 are similar to brake bands 27–29 in FIG. 1 with the exception that provision has been made for selectively anchoring either end of brake bands 27′–29′. As may be seen in FIGS. 2 and 3, both ends of each of the bands 27′–29′ have been provided with tension springs 31′ and 31″ respectively. The opposite ends of these springs 31′ and 31″ are connected to a fixed support illustrated as an insulator rod 24′. The ends of the brake bands 27′–29′ are each provided with slots **27*s*–29*s* respectively. The slots 27*s*–29*s* are adapted to receive the corresponding ends of stop members 55 which are preferably carried by a rod 56. When the motor M is driving shaft 11 for rotation in a counterclockwise direction, as shown by the arrow in FIG. 3, the stop member 55 is pivoted and locked into position shown in solid line in FIG. 3. This anchors the right-hand ends of the respective brake bands 27′–29′ by way of their slots 27*s*–29*s* to the stop member 55, thus removing the effect of springs 31′ on the respective brake bands. When motor M drives shaft 11 in reverse direction, the stop member 55 is pivoted and locked in its phantom-line position, as shown in FIG. 3. This anchors the opposite ends of brake bands 27′–29′, thus removing the effect of springs 31″ and permitting springs 31′** to again be effective on the brake bands.

By placing the tape capstan 18 between a pair of drive rings 16 and 17 in accordance with the present invention as described above rather than integral with one of them as shown in the plural ring arrangement of the aforesaid Fitch application, two successive starts of the rings are combined in one thus saved one period of slippage. In the plural ring arrangement of Fitch it was necessary to throw the transfer switch both ways to complete a cycle and it was necessary to hold the switch in one of its positions until the ring with the capstan completed its movement. Since this time might be indefinite due to varying friction drive or load, it was necessary to provide for a factor of safety thereby decreasing the speed of operation for each cycle. The transfer switch S need only be thrown one way per cycle thereby eliminating the factor of safety time previously required and simplifying the circuitry.

It shall be understood the invention is not limited to the specific arrangement shown and that changes and modifications may be made within the scope of the appended claims.

What is claimed is:

1. An electrostatic incremental drive suited for magnetic tape comprising a rotor adapted for continuous rotation, ring means on said rotor, friction means between said rotor and said ring means normally to drive said ring means with said rotor, said ring means including a drive member for engaging the tape and a pair of separate rings one disposed on either side of said drive member, electrostatic resistance material carried by and encircling each of said rings, a plurality of individual brake bands extending around and in engagement with said electrostatic resistance material on said rings, said individual brake bands being energized to lock one of said bands to its respective ring, and mechanical stop means on each ring of said pair effective on said drive member in timed relation with the energization of said brake bands to permit predetermined limited rotation of said drive member.

2. An electrostatic incremental drive according to claim 1 including means for energizing said individual brake bands.

3. An electrostatic incremental drive according to claim 1 wherein said mechanical stop means comprises structures on said rings respectively cooperating with structures on said drive member, said structures on said rings being disposed in overlapping relation with said structures on said drive member and one of each of said cooperating structures being smaller, as measured along its path of movement, than the corresponding dimension of the other of each said cooperating structures by an amount corresponding to said predetermined limited rotation.

4. An electrostatic incremental drive according to claim 3 wherein said cooperating structures comprises projections and shoulders defining recesses.

5. An electrostatic incremental drive according to claim 4 wherein said projections are on said drive member and said shoulders are on said rings.

6. An electrostatic incremental drive according to claim 1 including a third ring on said rotor adjacent one ring of said pair of rings, a rim of resistance material secured to said third ring, a third brake band engaging said resistance material on said third ring, means for energizing said third brake band while said other brake bands are deenergized to lock said third ring against rotation, and mechanical stop means on said third ring engaging said adjacent ring of said pair of rings to permit predetermined limited rotation of said pair of rings with said drive member.

7. An electrostatic incremental drive according to claim 1 wherein said rotor is reversible, and means for anchoring either end of said brake bands depending upon the direction of rotation of said rotor.

8. An electrostatic incremental drive according to claim 7 wherein both ends of said brake bands are resiliently connected to a support, and said anchoring means comprises structure carried by a support and selectively movable into locking engagement with either end of said brake bands at locations beyond the respective resilient connections to remove the effect of the latter from one end of said brake bands.

9. An electrostatic incremental drive according to claim 7 including spring means connected to each of the ends of said brake bands to maintain said bands in predetermined relation to said rotor, slots in each of said brake bands adjacent each of said ends thereof, and said anchoring means comprises structure within said slots and alternately movable to engage the end of the slot adjacent one end of said bands to lock that end of said bands to said structure.

10. An electrostatic incremental drive according to claim 6 including means for driving said rotor at a faster speed during said predetermined limited rotation of said pair of rings with said drive member.

11. An electrostatic incremental drive according to claim 1 wherein the magnetic tape is contacted by a magnetic head, said drive member for the tape has a channel portion on its outer surface to receive the tape and the magnetic head, and means to maintain the tape in said channel portion.

12. An electrostatic incremental drive according to claim 11 wherein the bottom of said channel portion is surfaced with a resilient material to engage the tape and provide a resilient backing for the tape as it passes over said drive member to insure good contact of the tape with the magnetic head.

13. An electrostatic incremental drive suited for magnetic tape comprising a plurality of rings, said rings being mounted on a continuously-driven shaft and normally driven from the shaft by a friction drive between said rings and a rotor carried by the shaft, a cylindrical capstan for the tape disposed between one pair of said rings, each of said rings having bonded to its outer surface a face of electrostatic resistance material, a brake band for each of said faces, each of said rings being held stationary when a voltage is applied to its respective brake band, and said rings and said capstan are provided with overlapping projections and recesses whereby a voltage applied to one of said brake bands will be effective to limit the rotation of the other rings and the tape capstan by reason of the overlapping relationship between said projections and recesses.

14. An electrostatic incremental drive according to claim 13 including a third ring adjacent one of said rings of said pair, said third ring having a face of electrostatic resistance material and a third brake band extending therearound, said third brake band being energized while said other brake bands are deenergized to lock said third ring against rotation, engaging mechanical stop means on said third ring and said adjacent ring of said pair of rings to permit predetermined limited rotation of said pair of rings with said tape capstan.

References Cited in the file of this patent

UNITED STATES PATENTS

| | | |
|---|---|---|
| 1,871,272 | Jongedyk | Aug. 9, 1932 |
| 2,073,983 | Anderson | Mar. 16, 1937 |
| 2,338,305 | Simmon | Jan. 4, 1944 |
| 2,541,013 | Clutz | Feb. 13, 1951 |
| 2,568,824 | Ralibek | Sept. 25, 1951 |
| 2,630,512 | Rahbel | Mar. 3, 1953 |
| 2,850,907 | Foster | Sept. 9, 1958 |

FOREIGN PATENTS

| | | |
|---|---|---|
| 438,860 | Germany | Dec. 28, 1926 |

UNITED STATES PATENT OFFICE

CERTIFICATE OF CORRECTION

Patent No. 2,995,286 August 8, 1961

Ralph E. Page

It is hereby certified that error appears in the above numbered patent requiring correction and that the said Letters Patent should read as corrected below.

Column 6, line 32, for "comprises" read -- comprise --; column 8, line 7, for "engaging" read -- and --; line 8, for "and" read -- engaging --.

Signed and sealed this 6th day of February 1962.

(SEAL)
Attest:

ERNEST W. SWIDER
Attesting Officer

DAVID L. LADD
Commissioner of Patents